United States Patent
Yamanaka et al.

(10) Patent No.: US 9,688,234 B2
(45) Date of Patent: Jun. 27, 2017

(54) FAR-SIDE AIRBAG APPARATUS

(71) Applicant: TOYODA GOSEI CO., LTD., Kiyosu-shi, Aichi-ken (JP)

(72) Inventors: Takayuki Yamanaka, Kiyosu (JP); Yasushi Masuda, Kiyosu (JP); Yuji Matsuzaki, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 14/807,143

(22) Filed: Jul. 23, 2015

(65) Prior Publication Data

US 2016/0031407 A1 Feb. 4, 2016

(30) Foreign Application Priority Data

Jul. 29, 2014 (JP) .................. 2014-154108
Aug. 7, 2014 (JP) .................. 2014-161792

(51) Int. Cl.
*B60R 21/231* (2011.01)
*B60R 21/207* (2006.01)
(Continued)

(52) U.S. Cl.
CPC ...... *B60R 21/23138* (2013.01); *B60R 21/207* (2013.01); *B60R 21/233* (2013.01);
(Continued)

(58) Field of Classification Search
CPC ............ B60R 21/23138; B60R 21/233; B60R 21/2338; B60R 21/2021; B60R 21/23146; B60R 21/23386
See application file for complete search history.

(56) References Cited

U.S. PATENT DOCUMENTS 5,636,862 A * 6/1997 Cheung ............. B60R 21/207
                                             280/730.2
7,549,672 B2 6/2009 Sato et al.
(Continued)

FOREIGN PATENT DOCUMENTS

GB  2 322 338 A  8/1998
JP  2005-306377 A  11/2005
(Continued)

OTHER PUBLICATIONS

European Search Report issued on Dec. 22, 2015 in the corresponding EP application No. 15176070.9.
(Continued)

*Primary Examiner* — James English
(74) *Attorney, Agent, or Firm* — Posz Law Group, PLC

(57) ABSTRACT

A far-side airbag apparatus includes an airbag and an inflator that discharges inflation gas for deploying and inflating the airbag. The airbag is fixed to the seat frame of the backrest of a vehicle seat and is deployed and inflated on the side corresponding to the center of the passenger compartment. The airbag is divided into first to third inflation chambers, and the first inflation chamber accommodates the inflator. The far-side airbag apparatus includes a tension belt having a first end and a second end. The first end of the tension belt is connected to the surface of the airbag at a position that corresponds to a seam, which divides the first inflation chamber and the second inflation chamber from each other, and the second end is connected to the seat frame.

8 Claims, 7 Drawing Sheets

(51) Int. Cl.
  *B60R 21/2338* (2011.01)
  *B60R 21/233* (2006.01)
(52) U.S. Cl.
  CPC *B60R 21/2338* (2013.01); *B60R 2021/23146* (2013.01); *B60R 2021/23161* (2013.01); *B60R 2021/23324* (2013.01); *B60R 2021/23382* (2013.01); *B60R 2021/23386* (2013.01)

(56) References Cited

U.S. PATENT DOCUMENTS

| | | | |
|---|---|---|---|
| 7,717,459 | B2 | 5/2010 | Bostrom et al. |
| 7,766,374 | B2* | 8/2010 | Abele ............. B60R 21/206 |
| | | | 280/730.1 |
| 8,282,126 | B2 | 10/2012 | Wiik et al. |
| 8,353,527 | B2 | 1/2013 | Sugimoto et al. |
| 2005/0236819 | A1 | 10/2005 | Riedel et al. |
| 2009/0001695 | A1 | 1/2009 | Suzuki et al. |
| 2010/0194083 | A1* | 8/2010 | Sugimoto ........... B60R 21/207 |
| | | | 280/730.2 |
| 2011/0025034 | A1* | 2/2011 | Lim .................. B60R 21/207 |
| | | | 280/743.2 |
| 2012/0038137 | A1* | 2/2012 | Wipasuramonton .... B60R 21/18 |
| | | | 280/733 |
| 2012/0049498 | A1* | 3/2012 | Wiik ............... B60R 21/23138 |
| | | | 280/743.2 |
| 2014/0035264 | A1* | 2/2014 | Fukushima ....... B60R 21/23138 |
| | | | 280/730.2 |
| 2014/0042733 | A1 | 2/2014 | Fukawatase |
| 2014/0103625 | A1 | 4/2014 | Thomas et al. |
| 2014/0151984 | A1 | 6/2014 | Fukawatase et al. |
| 2015/0274111 | A1 | 10/2015 | Ishida et al. |
| 2015/0343985 | A1 | 12/2015 | Sugimoto |
| 2015/0367804 | A1* | 12/2015 | Fujiwara ........... B60R 21/23138 |
| | | | 280/730.2 |

FOREIGN PATENT DOCUMENTS

| | | |
|---|---|---|
| JP | 2008-137458 A | 6/2008 |
| JP | 2008-302897 A | 12/2008 |
| JP | 2011-105309 A | 6/2011 |
| JP | 2012-081958 A | 4/2012 |

OTHER PUBLICATIONS

Office Action issued on Jan. 5, 2016 in the corresponding U.S. Appl. No. 14/807,015.

* cited by examiner

FAR-SIDE AIRBAG APPARATUS

BACKGROUND OF THE INVENTION

The present invention relates to a far-side airbag apparatus that deploys and inflates an airbag toward the center of a passenger compartment.

A far-side airbag apparatus, which deploys and inflates an airbag toward the center of a passenger compartment, is typically located in a vehicle seat used as the driver's seat or the front passenger seat. The far-side airbag apparatus deploys and inflates an airbag toward the center of the passenger compartment to partition the driver's seat and the front passenger seat from each other, thereby protecting an occupant.

As one such far-side airbag apparatus, a far-side airbag apparatus is known that includes a tension belt connected to the distal end of an airbag. The tension belt is configured to apply tension to a deployed and inflated airbag to maintain the attitude of the airbag (for example, refer to Japanese Laid-Open Patent Publication No. 2008-137458).

The tension belt, which is connected to the distal end of the airbag, remains slack until deployment and inflation of the airbag is substantially completed. Thus, in a far-side airbag apparatus having a tension belt connected to the distal end of the airbag, the tension belt does not start controlling the attitude of the airbag until the deployment and inflation of the airbag is substantially completed.

SUMMARY OF THE INVENTION

Accordingly, it is an objective of the present invention to provide a far-side airbag apparatus that is capable of controlling the attitude of an airbag during the process of deployment and inflation of the airbag before completion of the airbag deployment and inflation.

To achieve the foregoing objective and in accordance with one aspect of the present invention, a far-side airbag apparatus configured to be fixed to a seat frame of a backrest of a vehicle seat is provided. The apparatus includes an airbag, an inflation fluid generator, which discharges inflation fluid for deploying and inflating the airbag toward a center of a passenger compartment, and a tension belt having a first end and a second end. The airbag is divided into a plurality of inflation chambers, which include a first inflation chamber and a second inflation chamber. The inflation fluid generator is accommodated in the first inflation chamber. The first end of the tension belt is connected to a surface of the airbag at a position that corresponds to a seam that divides the first inflation chamber and the second inflation chamber from each other. The second end of the tension belt is connected to the seat frame.

According to the above described configuration, the tension belt is connected to the distal end of the first inflation chamber, which is closer to the inflation fluid generator than the distal end of the airbag is to the inflation fluid generator. Thus, in the inflation process of the airbag, the tension belt stops being slack when the first inflation chamber is deployed and inflated and applies tension to the airbag. Therefore, in the process of deployment and inflation of the airbag before completion of the airbag deployment and inflation, it is possible to control the attitude of the airbag.

To achieve the foregoing objective and in accordance with another aspect of the present invention, a far-side airbag apparatus configured to be fixed to a seat frame of a backrest of a vehicle seat is provided. The apparatus includes an airbag, an inflation fluid generator, which discharges infla- tion fluid for deploying and inflating the airbag toward a center of a passenger compartment, and an outer tension belt having a first end and a second end. The seat frame has a gutter-like cross section. The seat frame is embedded in a part of the backrest that corresponds to the center of the passenger compartment such that an inside of the gutter faces a center of the seat. The far-side airbag apparatus is fixed to a side surface of the seat frame that corresponds to the center of the passenger compartment. The outer tension belt is wound about a rear end of the seat frame. The first end is connected to a side surface of the airbag that corresponds to the center of the passenger compartment when the airbag is deployed. The second end is connected to the inside of the gutter of the seat frame.

According to the above described configuration, when the airbag is deployed and inflated and tension is applied to the outer tension belt, the rear part of the airbag is surrounded by the outer tension belt together with the seat frame. As a result, the airbag is supported by the seat frame not only in the part that is fixed to the seat frame by bolts, but also in the part surrounded by the outer tension belt. It is therefore possible to control the attitude of the airbag.

DESCRIPTION OF THE PREFERRED EMBODIMENTS

Figure 1:
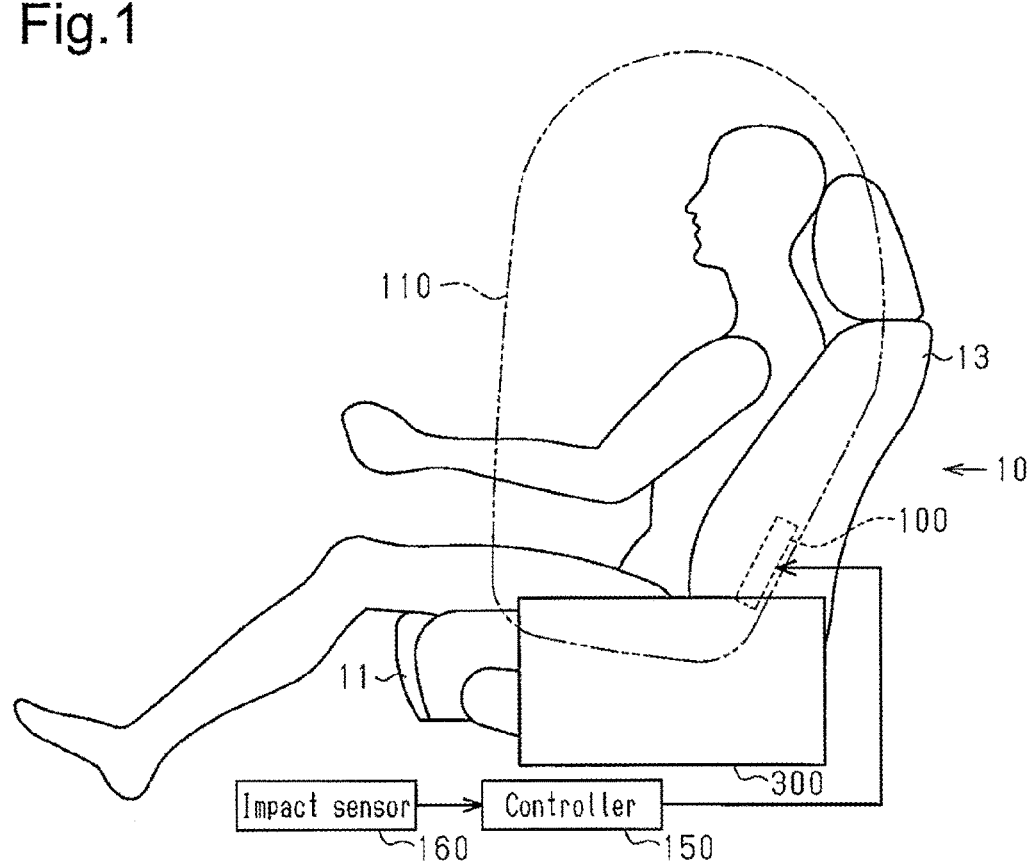
FIG. 1 is a diagram schematically showing the structure of a vehicle seat equipped with a far-side airbag apparatus according to one embodiment.

A vehicle seat 10 in which a far-side airbag apparatus 100 according to one embodiment is installed will now be described with reference to FIGS. 1 to 10. In FIG. 1, the left side corresponds to the front side of the vehicle, and the upper side corresponds to the upper side of the vehicle.

As shown in FIG. 1, the vehicle seat 10 has a seat portion 11 to which a backrest 13 is joined. As indicated by a broken line in FIG. 1, the far-side airbag apparatus 100 is installed in the backrest 13 of the vehicle seat 10. As illustrated in the lower section of FIG. 1, a controller 150 is connected to the far-side airbag apparatus 100, and the controller 150 is connected to an impact sensor 160.

The impact sensor 160 includes an acceleration sensor attached to a side pillar of the vehicle and detects an impact from the side of the vehicle due to, for example, a side collision. Based on a detection signal from the impact sensor 160, the controller 150 outputs a control signal for deploying an airbag 110 to the far-side airbag apparatus 100.

The backrest 13 accommodates the airbag 110 in a folded state of the far-side airbag apparatus 100, which will be described below. When the controller 150 outputs a control signal, the airbag 110 is deployed and inflated as indicated by the long dashed double-short dashed lines in FIGS. 1 and 2. The arrangement position and the vertical dimension of the airbag 110 are determined such that, when the airbag 110 is deployed and inflated, the lower end of the airbag 110 is located below the lower end of a center console box 300 as shown in FIG. 1. Thus, when the airbag 110 is deployed and inflated, the lower end of the airbag 110 enters the space between the occupant seated in the vehicle seat 10 and the center console box 300.

Figure 2:
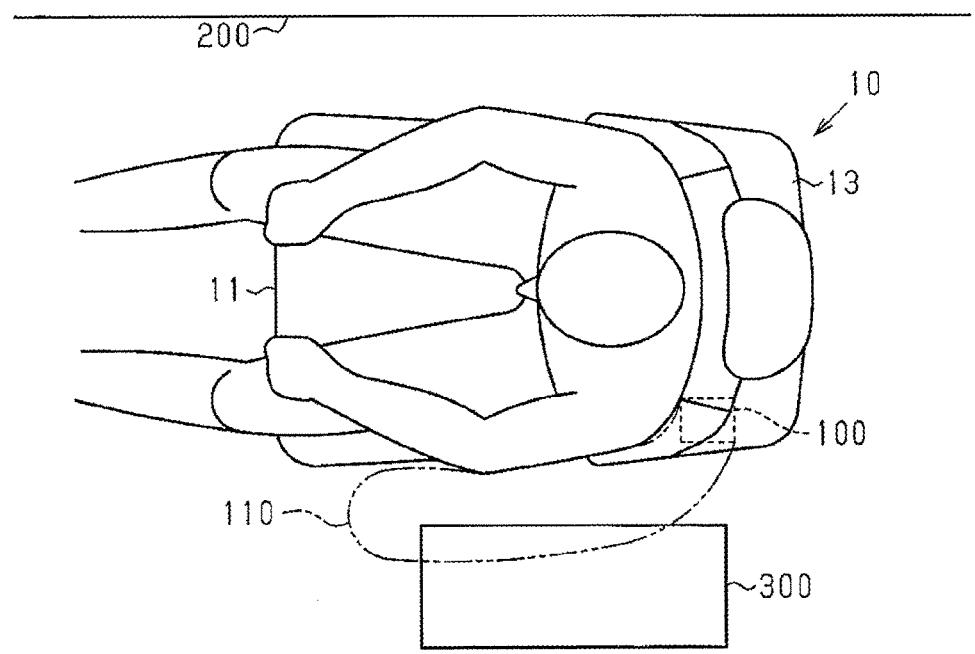
FIG. 2 is a plan view of the vehicle seat.

FIG. 2 is a plan view of the vehicle seat 10. In FIG. 2, the left side corresponds to the front side of the vehicle, and the lower side corresponds to the center of the passenger compartment. The vehicle also has a seatbelt device for restraining the occupant seated in the vehicle seat 10. In FIGS. 1 and 2, the seatbelt device is not illustrated.

Near-side airbag apparatuses have been known that deploy and inflate an airbag between a passenger compartment side wall 200 and an occupant. Such a near-side airbag deploys and inflates an airbag on the side closer to the side wall 200. Unlike near-side airbag apparatuses, the far-side airbag apparatus 100 is accommodated in the side of the vehicle seat backrest 13 that corresponds to the center of the passenger compartment as indicated by the broken line in FIG. 2. When the impact sensor 160 detects an impact from the side of the vehicle, the airbag 110 is deployed and inflated to partition the vehicle seat 10 from the adjacent seat as indicated by the long dashed double-short dashed line in FIG. 2.

Figure 3:
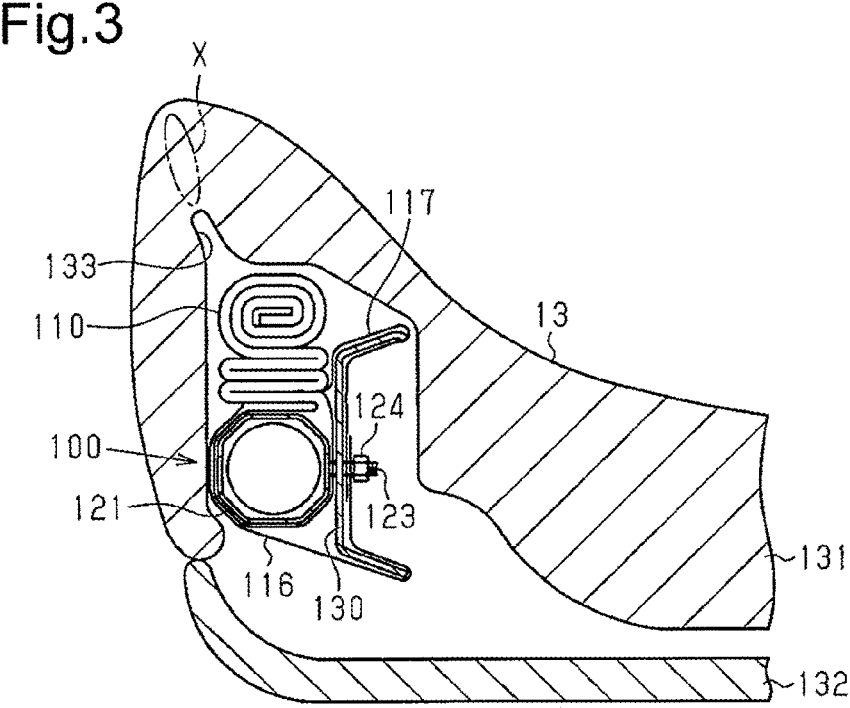
FIG. 3 is a cross-sectional view of the backrest of the vehicle seat in which the far-side airbag apparatus is installed.

With reference to FIG. 3, the structure of the far-side airbag apparatus 100 and the structure of the backrest 13, which accommodates the airbag apparatus 100, will be described. FIG. 3 is a cross-sectional view of a part of the backrest 13 that accommodates the side support on the inner side of the passenger compartment. In FIG. 3, the upper side corresponds to the front side of the vehicle, and the left side corresponds to the center of the passenger compartment.

As shown in FIG. 3, a seat frame 130, which is the framework of the backrest 13, is located inside the backrest 13. The seat frame 130 is formed by bending a metal plate to have a gutter-like cross section. The seat frame 130 is arranged such that the inside of the gutter faces the center of the seat 10. A pad 131, which is made of an elastic material such as urethane foam, fills the space about the seat frame 130 in the backrest 13. The pad 131 forms a part against which the occupant leans. The pad 131 is covered with seat upholstery, which is not illustrated in FIG. 3. A part of the backrest 13 that is relatively closer to the rear of the vehicle, that is, the back face of the backrest 13, is covered with a hard back plate 132, which is formed of plastic.

As illustrated in FIG. 3, a space for accommodating the far-side airbag apparatus 100 is provided in the backrest 13 in the side that corresponds to the center of the passenger compartment. The pad 131 has a slit 133, which extends from the front end of the space toward the front end of the side support. A part between the slit 133 and the front end of the side support (a part X surrounded by a long dashed double-short dashed line in FIG. 3) is broken when the airbag 110 is deployed and inflated.

The far-side airbag apparatus 100 includes the airbag 110 in a folded state and an inflator 121, which is an inflation fluid generator that discharges inflation fluid for deploying and inflating the airbag 110. In the present embodiment, a pyrotechnic inflator is used as the inflator 121. The inflator 121 is substantially columnar and accommodates a gas generating agent (not shown), which generates inflation gas as inflation fluid for inflating the airbag 110. In place of the pyrotechnic type inflator using the gas generating agent, it is possible to use a hybrid type inflator, which discharges inflation gas by breaking a partition wall of a high-pressure gas cylinder filled with high-pressure gas with a low explosive.

The inflator 121 has two bolts 123 for fixing the inflator 121 to the seat frame 130. The far-side airbag apparatus 100 is fixed to the side surface of the seat frame 130 corresponding to the center of the passenger compartment by threading nuts 124 to the bolts 123 with the bolts 123 passed through the seat frame 130 as illustrated in FIG. 3. In this manner, the far-side airbag apparatus 100 is compactly accommodated and fixed to the backrest 13 by folding the airbag 110 and placing the airbag 110 in front of the inflator 121 as shown in FIG. 3. An outer tension belt 116 and an inner tension belt 117, which will be discussed below, are attached to the airbag 110. A first end of each of the outer tension belt 116 and the inner tension belt 117 is connected to the airbag 110 and is folded together with the airbag 110, and a part of each of the outer tension belt 116 and the inner tension belt 117 is wound about the seat frame 130 as illustrated in FIG. 3.

Specifically, the outer tension belt 116 is wound about the rear end of the seat frame 130 to wrap the part of the airbag 110 that accommodates the inflator 121 and the rear end of the seat frame 130. In contrast, the inner tension belt 117 is wound about the front end of the seat frame 130 to wrap the front end of the seat frame 130.

Second ends of the outer tension belt 116 and the inner tension belt 117, which are wound to the inside of the gutter of the seat frame 130, are connected to the inside of the gutter of the seat frame 130 by the bolts 123 and the nuts 124. When attaching the far-side airbag apparatus 100 to the seat frame 130, the bolts 123 are passed through the second end of the outer tension belt 116 and the second end of the inner tension belt 117 before threading the nuts 124 to the bolts 123, and the second ends are overlaid on the inside of the gutter of the seat frame 130. Then, with the second ends of the outer tension belt 116 and the inner tension belt 117 held between the seat frame 130 and the nuts 124, the bolts 123 and the nuts 124 are fastened to each other to fix the far-side airbag apparatus 100 to the seat frame 130. In this manner, the second end of the outer tension belt 116 and the second end of the inner tension belt 117 are connected to the inside of the gutter of the seat frame 130 by the bolts 123 and the nuts 124, which fix the far-side airbag apparatus 100 to the seat frame 130.

The configuration of the airbag 110 will now be described with reference to FIGS. 4 and 5.

Figure 4:
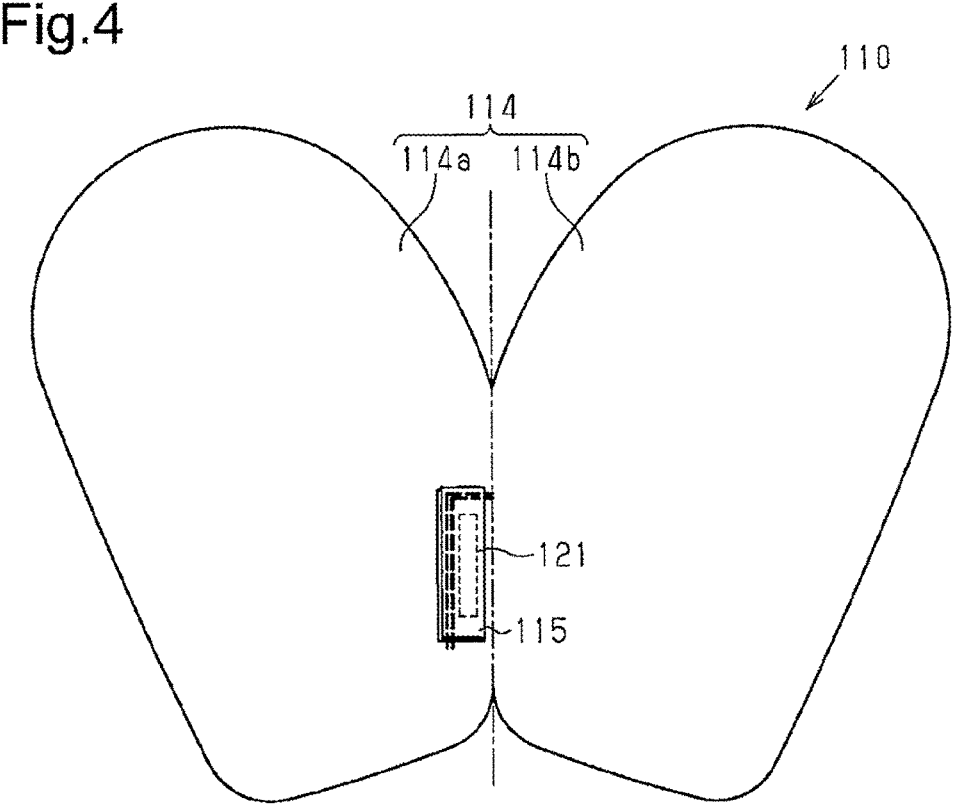
FIG. 4 is a front view showing a base fabric sheet forming an airbag.

As shown in FIG. 4, the airbag 110 is formed into a bag shape by folding a base fabric sheet 114, which has a line-symmetric shape, in half along a folding line defined at the center so that the base fabric sheet 114 is overlaid onto itself. The single base fabric sheet 114 includes an inner panel 114a, which forms the side surface corresponding to the center of the vehicle seat 10, and an outer panel 114*b*, which forms the side surface corresponding to the center of the passenger compartment. That is, the surface of the airbag 110 is formed by a pair of fabric panels, which are the inner panel 114*a* and the outer panel 114*b*. The base fabric sheet 114 is preferably formed of a material having high strength and flexibility to be easily folded. The material may be, for example, woven cloth formed of polyester threads or polyamide threads. In FIG. 4, the folding line is indicated by a long dashed short dashed line.

Figure 5:
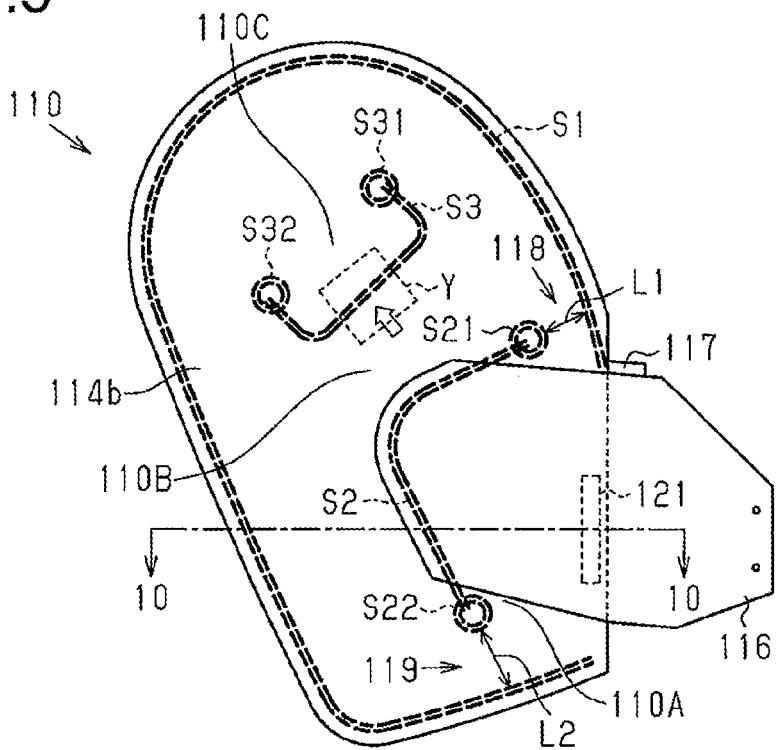
FIG. 5 is a side view showing the airbag before being folded.

The airbag 110 is formed by overlaying the inner panel 114*a* and the outer panel 114*b* onto each other and then sewing the peripheral portions of the panels 114*a*, 114*b* together with a seam S1, which is indicated by double broken line in FIG. 5. In FIG. 5, the left side corresponds to the front side of the vehicle, and the upper side corresponds to the upper side of the vehicle. In FIG. 5, the side closer to the viewer of the drawing corresponds to the center of the passenger compartment, and the side farther from the viewer of the drawing corresponds to the center of the vehicle seat 10.

As shown in FIG. 5, the base fabric sheet 114 of the airbag 110 is folded back on the side closer to the rear of the vehicle.

As shown in FIG. 4, an inner tube 115 for accommodating the inflator 121 is provided at the center of the base fabric sheet 114. The inner tube 115 is formed of a square fabric sheet made of the same material as that of the base fabric sheet 114. Specifically, the square fabric sheet is folded in half and laid onto the base fabric sheet 114. In this state, a short side and the long side parallel with the folding line are sewn together with the base fabric sheet 114, so that a tubular shape is obtained. In the airbag 110, the upper end of the inner tube 115 is closed. That is, the inner tube 115 is sewn to the inner panel 114*a* to open downward.

A part of the airbag 110 in a right lower corner as viewed in FIG. 5, that is, the lower end in a part closer to the vehicle rear end, has an opening for receiving the inflator 121. The inflator 121 is inserted into the airbag 110 through the opening.

The airbag 110 has multiple inflation chambers, which are formed by sewing a pair of the inner panel 114*a* and the outer panel 114*b* together.

As shown in FIG. 5, the airbag 110 has a first inflation chamber 110A, which is formed by sewing the inner panel 114*a* and the outer panel 114*b* together with a seam S2. The first inflation chamber 110A includes a part that accommodates the inflator 121. The airbag 110 has a third inflation chamber 110C defined by sewing the inner panel 114*a* and the outer panel 114*b* together with a seam S3.

The airbag 110 has a second inflation chamber 110B between the first inflation chamber 110A and the third inflation chamber 110C. Thus, the seam S2 is located at the boundary between the first inflation chamber 110A and the second inflation chamber 110B to divide these inflation chambers 110A and 110B from each other. The seam S3 is located at the boundary between the second inflation chamber 110B and the third inflation chamber 110C to divide these inflation chambers 110B and 110C from each other. Ends S21, S22 of the seam S2 are formed as circles to ensure reinforcement. Ends S31, S32 of the seam S3 are also formed as circles to ensure reinforcement.

As shown in FIG. 5, of the ends S21 and S22 of the seam S2 of the airbag 110, the end S21, which is located on the upper side, is separated away from the seam S1. When the inflator 121, which is located in the first inflation chamber 110A, discharges inflation gas to deploy and inflate the airbag 110, the inflation gas is discharged upward from the first inflation chamber 110A through between the seam S1 and the end S21 in the airbag 110. That is, a part of the airbag 110 between the seam S1 and the end S21 forms an upward passage 118 that discharges inflation gas upward from the first inflation chamber 110A.

As shown in FIG. 5, of the ends S21 and S22 of the seam S2, the end S22, which is located on the lower side, is also separated away from the seam S1. When the inflator 121, which is located in the first inflation chamber 110A, discharges inflation gas to deploy and inflate the airbag 110, the inflation gas is discharged forward from the first inflation chamber 110A through between the seam S1 and the end S22 in the airbag 110. That is, a part of the airbag 110 between the seam S1 and the end S22 forms a forward passage 119 that discharges inflation gas forward from the first inflation chamber 110A.

A distance $L2$ between the seam S1 and the end S22 in the airbag 110 is set to be longer than a distance $L1$ between the seam S1 and the end S21. Accordingly, the cross-sectional area of the forward passage 119 is larger than that of the upward passage 118.

As described above, the airbag 110 has the outer tension belt 116 and the inner tension belt 117, which are wound about the seat frame 130.

As shown in FIG. 5, the distal end, or the first end, of the outer tension belt 116 is sewn to the surface of the outer panel 114*b* with the seam S2, which divides the first inflation chamber 110A and the second inflation chamber 110B from each other. Accordingly, the distal end, or the first end, of the outer tension belt 116 is connected to the surface of the outer panel 114*b* of the airbag 110 at a position that corresponds to the seam S2. The outer tension belt 116 extends toward the rear of the vehicle and is wound about the seat frame 130 as described above. As shown in FIG. 5, the vertical dimension of the outer tension belt 116 is set such that the upper end is located above the part that accommodates the inflator 121 in the airbag 110 in a spread state.

The distal end, or the first end, of the inner tension belt 117 is sewn to the surface of the inner panel 114*a* with the seam S2, which defines the first inflation chamber 110A and the second inflation chamber 110B from each other. Accordingly, the distal end, or the first end, of the inner tension belt 117 is connected to the surface of the inner panel 114*a* in the airbag 110 at a position that corresponds to the seam S2. The inner tension belt 117 extends toward the rear of the vehicle and is wound about the seat frame 130 as described above.

A method for folding the airbag 110, which is configured as described above, will now be described with reference to FIGS. 6A to 8B. For illustrative purposes, the outer tension belt 116, the inner tension belt 117, and the seams S1, S2, S3 are not illustrated in FIGS. 6A to 8B, which only schematically show the airbag 110.

Figure 6A:
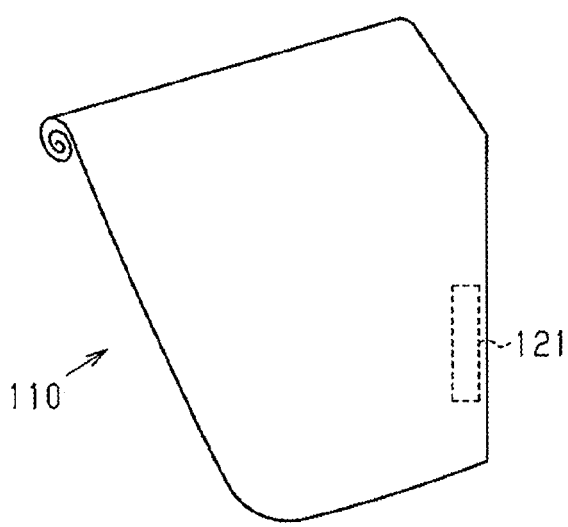
FIGS. 6A and 6B are diagrams showing a manner in which the airbag is folded.
Figure 6B:
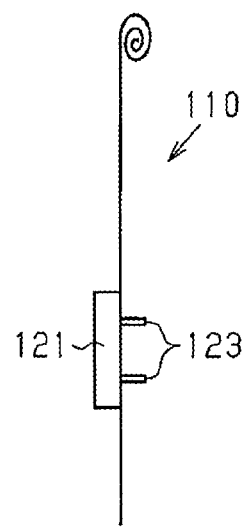

In FIG. 6A, the right side corresponds to the rear side of the vehicle, and the upper side corresponds to the upper side of the vehicle. In FIG. 6A, the side closer to the viewer of the drawing corresponds to the center of the passenger compartment, and the side farther from the viewer of the drawing corresponds to the center of the vehicle seat 10. FIG. 6B schematically shows the airbag 110 as viewed from the rear of the vehicle.

Figure 7A:
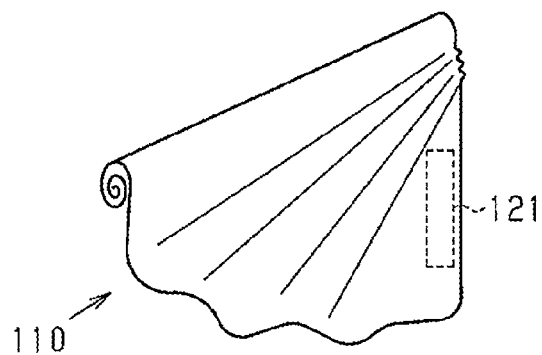
FIGS. 7A and 7B are diagrams showing the manner in which the airbag is folded.
Figure 7B:
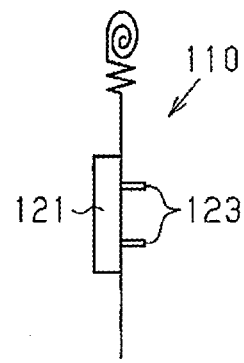

As shown in FIGS. 6A and 6B, the airbag 110 is first roll-folded. Specifically, the airbag 110 is repeatedly folded in one direction from the top toward the part that accommodates the inflator 121, such that the side surface corresponding to the center of the vehicle seat 10, that is, the inner panel 114*a*, is rolled inward. After the airbag 110 is folded halfway by the roll-folding to form a rod-like portion. The remaining portion of the airbag 110 is accordion-folded toward the rear end of the vehicle to form a sectoral shape with an end of the rod-like portion closer to the inflator accommodating portion serving as the center. That is, the remaining portion is accordion-folded such that the other end of the rod-like portion, which has been formed by the roll-folding, approaches the inflator 121. In FIG. 7A also, the right side corresponds to the rear side of the vehicle, and the upper side corresponds to the upper side of the vehicle. In FIG. 7A, the side closer to the viewer of the drawing corresponds to the center of the passenger compartment, and the side farther from the viewer of the drawing corresponds to the center of the vehicle seat 10. FIG. 7B schematically shows the airbag 110 as viewed from the rear of the vehicle.

Figure 8A:
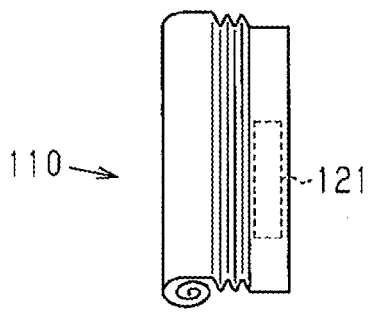
FIGS. 8A and 8B are diagrams showing the manner in which the airbag is folded.
Figure 8B:

After having been folded in the above described manner, the airbag 110 has the shape illustrated in FIGS. 8A and 8B. In FIG. 8A also, the right side corresponds to the rear side of the vehicle, and the upper side corresponds to the upper side of the vehicle. In FIG. 8A, the side closer to the viewer of the drawing corresponds to the center of the passenger compartment, and the side farther from the viewer of the drawing corresponds to the center of the vehicle seat 10. FIG. 8B schematically shows the airbag 110 as viewed from below.

The far-side airbag apparatus 100, in which the airbag 110 has been folded in the above described manner, is fixed to the seat frame 130 of the vehicle seat 10 and accommodated in the backrest 13 of the vehicle seat 10 as shown in FIG. 3.

The far-side airbag apparatus 100 is configured such that the length of the roll-folded part is longer than the length of the accordion-folded part. Compared to the accordion-folded part, the roll-folded part is likely to stabilize the direction in which the airbag 110 is deployed when being unfolded. In contrast, compared to the roll-folded part, the accordion-folded part is easily and quickly unfolded. Taking into consideration such differences in the properties of the folding manners, the far-side airbag apparatus 100 is designed to promote the forward deployment using the accordion-folded part, while roll-folding the longer part to allow the airbag 110 to be deployed and inflated to a proper position.

Operation of the vehicle seat 10, which is equipped with the above described far-side airbag apparatus 100, will now be described.

When detecting an impact from the side of the vehicle due to, for example, a side collision, the impact sensor 160 outputs a detection signal. Based on the detection signal from the impact sensor 160, the controller 150 outputs a control signal for deploying the airbag 110 to the far-side airbag apparatus 100. In response to the control signal output from the controller 150, the inflator 121 discharges inflation gas as indicated by arrows in FIG. 9.

Figure 9:
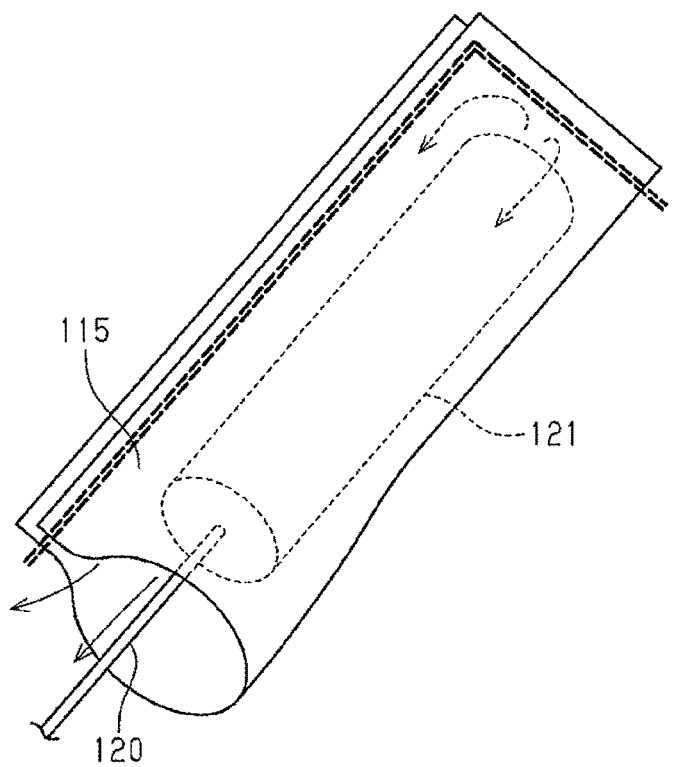
FIG. 9 is a perspective view of an inner tube, illustrating a manner in which inflation gas is discharged.

As shown in FIG. 9, a wire 120 for inputting the control signal to the inflator 121 is connected to the first end in the longitudinal direction of the inflator 121. Inflation gas is discharged from the second end in the longitudinal direction of the inflator 121. On account of the routing of the wire 120, the inflator 121 is accommodated in the inner tube 115 such that the first end, to which the wire 120 is connected, faces downward, and the second end, through which inflation gas is discharged, faces upward.

As described above, the upper end of the inner tube 115 is closed. As indicated by arrows in FIG. 9, the inflation gas discharged from the inflator 121 is discharged into the airbag 110 through the lower open end of the inner tube 115.

When the inflator 121 discharges inflation gas, which is then discharged into the airbag 110 through the inner tube 115, the pressures in the inflation chambers 110A, 110B, 110C are increased. As a result, the airbag 110 is deployed and inflated in the reverse order of the manner in which it has been folded as illustrated in FIGS. 6A to 8B.

Specifically, the accordion-folded part is unfolded as shown in FIGS. 7A and 7B, so that the airbag 110 is deployed and inflated. The airbag 110 is thus deployed and inflated toward the front end of the vehicle. During the forward deployment and inflation, a part between the slit 133 and the front end of the side support (a part X surrounded by the long dashed double-short dashed line in FIG. 3) is broken so that the airbag 110 is projected forward from the side support.

Next, the roll-folded part is unfolded as shown in FIGS. 6A and 6B, so that the airbag 110 is deployed and inflated upward. The airbag 110 has been folded by roll-folding, in which the airbag 110 is repeatedly folded in one direction such that the inner panel 114a is rolled inward. That is, the airbag 110 has been folded by roll-folding, in which the airbag 110 is repeatedly folded in one direction such that the side surface corresponding to the center of the vehicle seat 10 is rolled inward. Thus, when the roll-folded part is unfolded, the airbag 110 is deployed and inflated upward while being curved toward the occupant seated in the vehicle seat 10 in an encompassing manner.

During the deployment and inflation of the airbag 110, the inflation gas discharged through the inner tube 115 is diffused into the first inflation chamber 110A and flows into the second inflation chamber 110B via the upward passage 118 and the forward passage 119. As described above, the airbag 110 is configured such that the cross-sectional area of the forward passage 119 is larger than that of the upward passage 118. Accordingly, the amount of inflation gas that is discharged forward through the forward passage 119 and flows into the second inflation chamber 110B is greater than the amount of inflation gas that is discharged upward through the upward passage 118 and flows into the second inflation chamber 110B.

The inflation gas is discharged to the lower part of the first inflation chamber 110A through the lower open end of the inner tube 115. Thus, the inflation gas is more likely to flow to the second inflation chamber 110B through the forward passage 119, which is located at the lower part of the first inflation chamber 110A, than through the upward passage 118, which is located at the upper part of the first inflation chamber 110A.

Thus, in the far-side airbag apparatus 100, the forward deployment and inflation is promoted more than the upward deployment and inflation. That is, when the airbag 110 is deployed and inflated, the airbag 110 is first deployed and inflated forward. The airbag 110, which has been deployed forward, is then deployed upward.

The airbag 110 is therefore quickly deployed and inflated on the inner side of the passenger compartment of the occupant seated in the vehicle seat 10 to partition the vehicle seat 10 from the adjacent front passenger seat. That is, the airbag 110 is deployed and inflated to the proper position for protecting the occupant.

In the process of deployment and inflation of the airbag 110, inflation of the first inflation chamber 110A generates tension in the outer tension belt 116 and the inner tension belt 117, which are connected to the seam S2, which defines the first inflation chamber 110A. The generated tension acts on the airbag 110.

Figure 10:
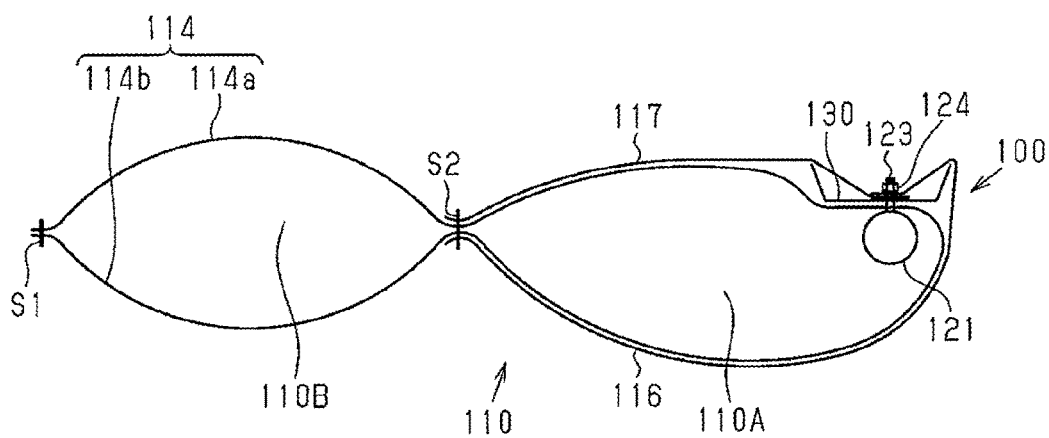
FIG. 10 is a diagram showing a state in which the airbag is deployed and inflated.

FIG. 10 illustrates a state in which the airbag 110 is deployed and inflated and receives the tension of the outer tension belt 116 and the inner tension belt 117. The cross-section of FIG. 10 is taken along line 10-10 of FIG. 5.

As shown in FIG. 10, the first inflation chamber 110A of the airbag 110 is inflated also rearward and toward the center of the passenger compartment from the part that accommodates the inflator 121.

The outer tension belt 116 is wound about the rear end of the seat frame 130 to wrap the part of the airbag 110 that accommodates the inflator 121 and the rear end of the seat frame 130. Thus, when the first inflation chamber 110A is inflated, the part of the airbag 110 to which the outer tension belt 116 is connected receives tension in a direction toward the center of the passenger compartment and tension toward the rear end of the vehicle via the outer tension belt 116. The length of the outer tension belt 116 is set such that when the first inflation chamber 110A is inflated, the outer tension belt 116 extends along the outer panel 114b and to its full length without slackening and generates necessary tension.

In contrast, the inner tension belt 117 is wound about the front end of the seat frame 130 to wrap the front end of the seat frame 130. Thus, when the airbag 110 is deployed and inflated so that the inner tension belt 117 receives tension, the inner tension belt 117 bridges the front end of the seat frame 130 that corresponds to the center of the vehicle seat 10 and the side surface of the airbag 110 that corresponds to the center of the vehicle seat 10. Thus, when the first inflation chamber 110A is inflated, the part of the airbag 110 to which the inner tension belt 117 is connected receives tension in the direction toward the center of the seat and tension toward the rear end of the vehicle via the inner tension belt 117. The length of the inner tension belt 117 is set such that when the first inflation chamber 110A is inflated, the inner tension belt 117 bridges the front end of the seat frame 130 that corresponds to the center of the vehicle seat 10 and the side of the airbag 110 that corresponds to the center of the vehicle seat 10 to generate necessary tension.

The rear part of the airbag 110 is surrounded by the outer tension belt 116 together with the seat frame 130 as shown in FIG. 10. Therefore, the airbag 110 is supported by the seat frame 130 not only in the part that is fixed to the seat frame 130 by the bolts 123, but also in the part surrounded by the outer tension belt 116.

The above described far-side airbag apparatus 100 achieves the following advantages.

(1) The tension belts 116, 117 are connected to the front end of the first inflation chamber 110A, which is closer to the inflator 121 than the distal end of the airbag 110 is to the inflator 121. Thus, when the first inflation chamber 110A is deployed and inflated during the inflation process of the airbag 110, the tension belts 116, 117 stop being slack and apply tension to the airbag 110. Therefore, it is possible to control the attitude of the airbag 110 during the process of deployment and inflation of the airbag 110, that is, before completion of the airbag deployment and inflation.

(2) The tension belts 116, 117 are sewn to the base fabric sheet 114 with the seam S2, which sews a pair of the inner panel 114a and the outer panel 114b together. Therefore, when forming the first inflation chamber 110A, the tension belts 116, 117 are sewn to the base fabric sheet 114.

(3) When deployed and inflated, the airbag 110 receives tension from both the side corresponding to the center of the passenger compartment and the side corresponding to the center of the seat 10 by a pair of the tension belts 116, 117. Therefore, the stability of the attitude of the airbag 110 is improved compared to a case in which a tension belt is provided only one of the side of the airbag 110 corresponding to the center of the passenger compartment and the side corresponding to the center of the seat 10.

(4) When the airbag 110 is deployed and inflated and tension is applied to the outer tension belt 116, the rear part of the airbag 110 is surrounded by the outer tension belt 116 together with the seat frame 130. As a result, the airbag 110 is supported by the seat frame 130 not only in the part that is fixed to the seat frame 130 by the bolts 123, but also in the part surrounded by the outer tension belt 116. It is therefore possible to control the attitude of the airbag 110. Specifically, the airbag 110 is restrained from rotating and falling backward about a part that is fixed to the seat frame 130 by the bolts 123.

(5) When the force with which the airbag 110 is inflated rearward acts on the outer tension belt 116, the part of the airbag 110 to which the outer tension belt 116 is connected receives tension via the outer tension belt 116. Thus, the tension that acts via the outer tension belt 116 controls the attitude of the airbag 110.

(6) When the airbag 110 is deployed and inflated so that the inner tension belt 117 receives tension, the inner tension belt 117 bridges the front end of the seat frame 130 that corresponds to the center of the vehicle seat 10 and the side surface of the airbag 110 that corresponds to the center of the vehicle seat 10. Thus, when the airbag 110 receives a load in a direction toward the center of the passenger compartment while being deployed and inflated, the inner tension belt 117 retains the airbag 110 at the center of the seat to restrain the airbag 110 from falling toward the center of the passenger compartment.

(7) The bolts 123 are passed through an end of the outer tension belt 116 and an end of the inner tension belt 117 to hold and fix these ends between the seat frame 130 and the nuts 124. Thus, the outer tension belt 116 and the inner tension belt 117 are connected to the seat frame 130 by using the bolts 123 and the nuts 124, which are designed for attaching the far-side airbag apparatus 100 to the seat frame 130. This reduces the number of components and the number of steps for installation.

(8) The airbag 110 is fixed to the seat frame 130 after being folded toward the inflator 121. Thus, the far-side airbag apparatus 100 is fixed to the seat frame 130 at or in the vicinity of a part where the inflator 121 is accommodated. To protect the head of the occupant, the airbag 110 of the far-side airbag apparatus 100 is deployed and inflated to reach a position higher than the part where the inflator 121 is accommodated. Since the part of the airbag 110 that is located above the part where the inflator 121 is accommodated is surrounded by the outer tension belt 116, the airbag 110 is supported at a position above the points at which the airbag 110 is fixed to the seat frame 130 by the bolts 123. Specifically, the airbag 110 is effectively restrained from rotating and falling backward about the part that is fixed to the seat frame 130 by the bolts 123, so that the attitude of the airbag 110 is controlled.

The higher the upper end of the part of the airbag 110 that is surrounded by the outer tension belt 116 is, the more effective the restraint of the airbag 110 from rotating and falling backward about the part fixed to the seat frame 130 becomes. However, the greater the dimension of the outer tension belt 116 is, the greater the part of the outer tension belt 116 that is folded together with the airbag 110 becomes. This in turn extends the time before the outer tension belt 116 is unfolded and starts receiving tension. It is therefore preferable that the dimension of the outer tension belt 116 be determined by taking into consideration the relationship between the effect of restraining the airbag 110 from falling backward and the time at which the outer tension belt 116 starts functioning during the process of deployment and inflation.

The above described embodiment may be modified as follows.

Figure 11:
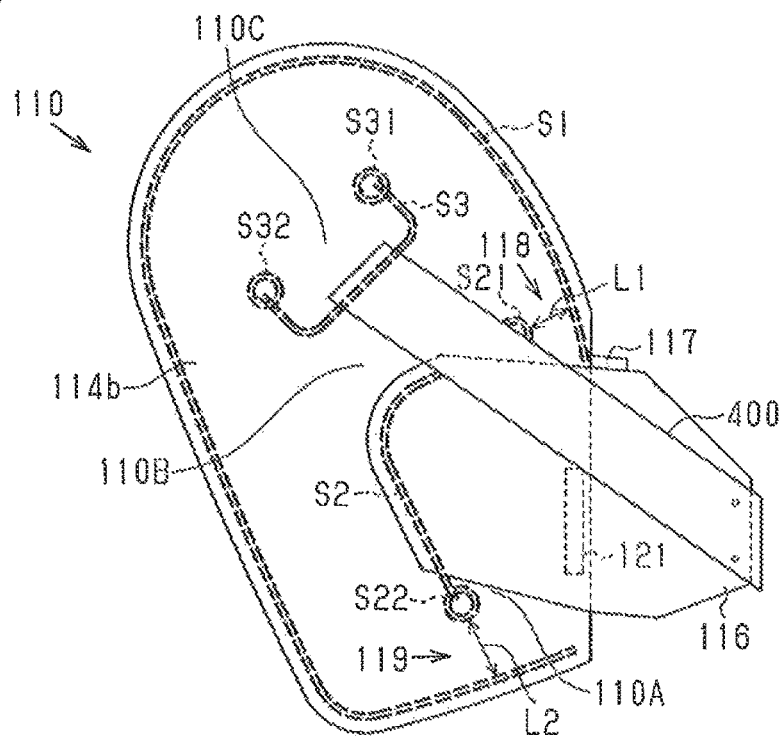
FIG. 11 is a side view of a far-side airbag apparatus according to an embodiment different from the embodiment of FIG. 1, illustrating a state before an airbag is folded.

In addition to the tension belts 116, 117, which are connected to the seam S2, which divides the first inflation chamber 110A and the second inflation chamber 110B from each other, the far-side airbag apparatus 100 may have another tension belt connected to the airbag 110. For example, as shown in FIG. 11, the far-side airbag apparatus 100 may further include a tension belt 400 having a first end and a second end. The first end of the tension belt 400 is connected to the airbag 110 at a position that corresponds to the seam S3, which divides the second inflation chamber 110B and the third inflation chamber 110C from each other, and the second end is connected to the seat frame 130. In this case, the seam S2 corresponds to a first seam, and the tension belts 116, 117 each correspond to a first tension belt. Also, the seam S3 corresponds to a second seam, and the tension belt 400 corresponds to a second tension belt. When the deployment and inflation of the first inflation chamber 110A and the second inflation chamber 110B is completed, the tension belt 400 applies tension to the airbag 110. In this configuration, in addition to a pair of the tension belts 116, 117, another tension belt (for example, the tension belt 400) applies tension to the airbag 110. This improves the controllability of the attitude of the airbag 110.

In the example of FIG. 11, the part at which the tension belt 400 is connected to the airbag 110 is located above the parts at which the tension belts 116, 117 are connected to the airbag 110. The tension belt 400 thus applies tension to the upper part of the airbag 110. Thus, the addition of the tension belt 400 to the tension belts 116, 117 further improves the controllability of the attitude of the upper part of the airbag 110.

The method for folding the airbag 110 is not limited to the one illustrated in the above embodiment but may be changed as necessary. For example, the direction of the roll-folding may be opposite to the one in the above illustrated embodiment.

The above illustrated embodiment has the inner tube 115, which accommodates the inflator 121. However, the inner tube 115 may be omitted and the inflator 121 may be directly accommodated in the airbag 110.

Not limited to the structure in which the single base fabric sheet 114 is folded into a bag shape, the airbag 110 may be formed by overlaying two base fabric sheets onto each other and sewing these together. Alternatively, three or more base fabric sheets may be connected together to form an airbag.

Instead of sewing, the airbag 110 may be formed by bonding a base fabric sheet 114 using an adhesive.

In the illustrated embodiment, the airbag 110 has the first inflation chamber 110A, the second inflation chamber 110B, and the third inflation chamber 110C. However, the shape and the number of the inflation chambers and the manner in which the inflation chambers are partitioned may be changed as necessary.

Figure 12:
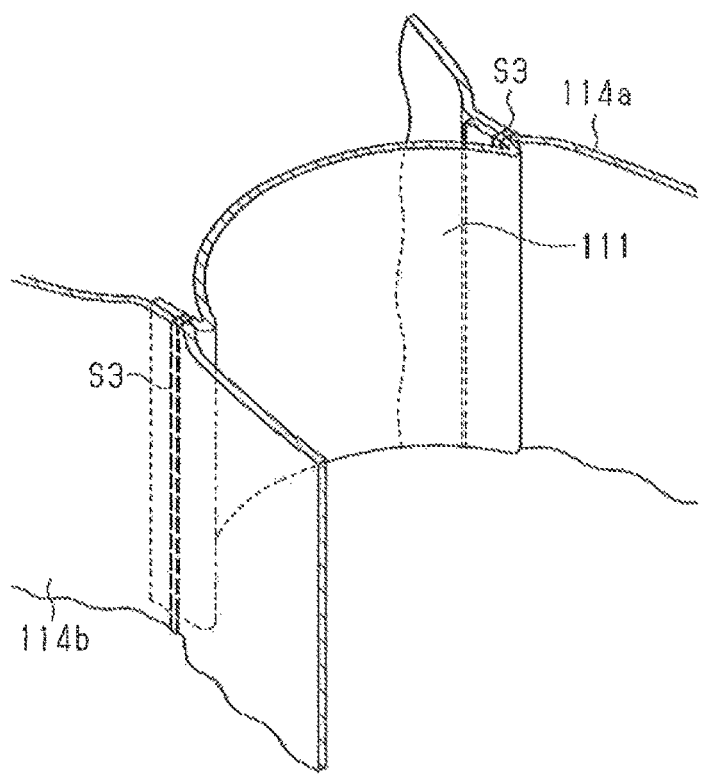
FIG. 12 is a cross-sectional perspective view of a far-side airbag apparatus according to an embodiment different from the embodiments of FIGS. 1 and 11, illustrating a state of a partition formed in an airbag.

For example, as shown in FIG. 12, a tether 111 may be provided to bridge the inner panel 114a and the outer panel 114b to form a partition that divides inflation chambers from each other. FIG. 12 illustrates the interior of the airbag 110 at a part Y, which is surrounded by a broken line in FIG. 5, as viewed in the direction of the hollow arrow.

Figure 13:
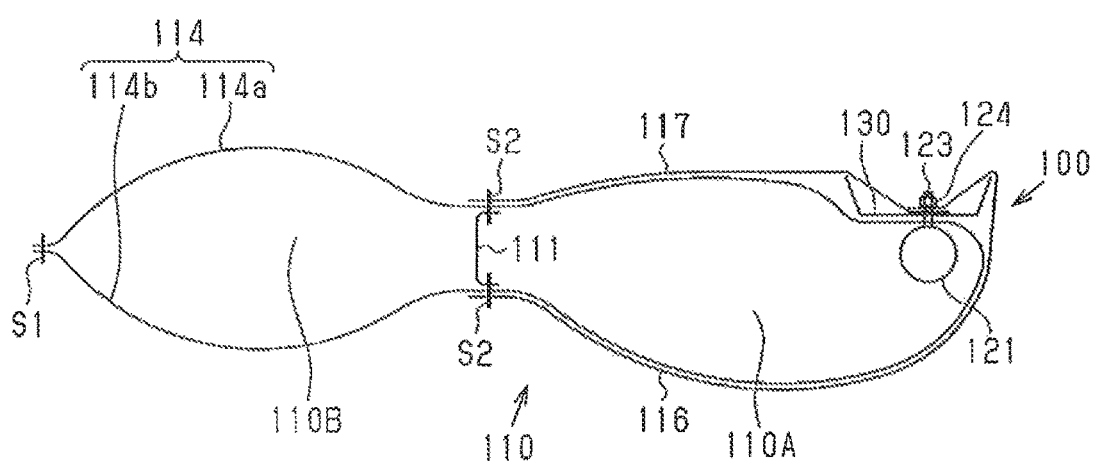
FIG. 13 is a diagram showing a state in which the airbag of FIG. 12 is deployed and inflated.

When the tether 111 is used for dividing inflation chambers from each other as shown in FIG. 12, the distal end, or the first end, of the outer tension belt 116 and the tether 111, which divides the first inflation chamber 110A and the second inflation chamber 110B from each other, are sewn to the surface of the outer panel 114b with the seam S2, which sews the tether 111 and a pair of the inner panel 114a and the outer panel 114b together as shown in FIG. 13. Likewise, the distal end, or the first end, of the inner tension belt 117 and the tether 111, which divides the first inflation chamber 110A and the second inflation chamber 110B from each other, are sewn to the surface of the inner panel 114a with the seam S2.

In the illustrated embodiment, the bolts 123 are passed through the outer tension belt 116 and the inner tension belt 117, and the nuts 124 are used for fixing the outer tension belt 116 and the inner tension belt 117 to the seat frame 130. The method for fixing the tension belts 116, 117 is not limited to this, but may be modified as necessary. For example, bolts dedicated for fixing the tension belts 116, 117 may be provided. Alternatively, the tension belts 116, 117 may be fixed with adhesive.

The positions at which the tension belts 116, 117 are fixed may be changed as necessary. For example, as long as the inner tension belt 117 bridges the side of the front end of the seat frame 130 that corresponds to the center of the vehicle seat 10 and the side surface of the airbag 110 that corresponds to the center of the vehicle seat 10 when the first inflation chamber 110A is deployed and inflated, the inner tension belt 117 may be fixed to a part of the front end of the seat frame 130 that is close to the edge corresponding to the center of the seat 10.

Also, as long as the outer tension belt 116 is configured to surround the rear part of the airbag 110 and the seat frame 130 when the airbag 110 is deployed and inflated, the outer tension belt 116 may be fixed to a part of the rear end of the seat frame 130 that is close to the edge corresponding to the center of the seat 10.

The positions at which the outer tension belt 116 and the inner tension belt 117 are connected to the airbag 110 may be different from the position that corresponds to a seam that divides the inflation chambers from each other. The tension belts maybe connected to the airbag 110 at positions different from the positions that correspond to seams that divides inflation chambers from each other.

Substantially the entire airbag 110 may be configured to be inflated as in the above-illustrated embodiment, but may also partially include a non-inflation portion, which neither supplied with inflation gas nor inflated.

Vehicles to which the far-side airbag apparatus according to the present invention is applied include various industrial vehicles in addition to private automobiles.

The invention claimed is:

1. A far-side airbag apparatus configured to be fixed to a seat frame of a backrest of a vehicle seat of a vehicle, the apparatus comprising:
   an airbag;
   an inflation fluid generator, which discharges inflation fluid for deploying and inflating the airbag toward a center of a passenger compartment; and
   a tension belt having a first end and a second end, wherein
   the airbag is divided into a plurality of inflation chambers, which include a first inflation chamber and a second inflation chamber,
   the inflation fluid generator is accommodated in the first inflation chamber,
   the first end of the tension belt is connected to a surface of the airbag at a position that corresponds to a seam, which divides the first inflation chamber and the second inflation chamber from each other and is curved to protrude toward a front of a vehicle, the second end of the tension belt is connected to the seat frame, and the tension belt includes a portion, which is located below a foremost part of the seam in a front-rear direction of the vehicle.

2. The far-side airbag apparatus according to claim 1, wherein the surface of the airbag is formed by a pair of fabric panels, the inflation chambers are divided from each other by sewing the fabric panels to each other, the seam is a seam that sews the fabric panels to each other, and the tension belt is sewn to one of the fabric panels with the seam.

3. The far-side airbag apparatus according to claim 1, wherein the surface of the airbag is formed by a pair of fabric panels, the airbag includes a tether, wherein the tether forms a partition that bridges between the fabric panels and divides the inflation chambers from each other, the inflation chambers are divided from each other by sewing the tether and the fabric panels to each other, the seam is a seam that sews the tether and the fabric panels to each other, and the tension belt is sewn to one of the fabric panels with the seam together with the tether.

4. The far-side airbag apparatus according to claim 1, wherein the tension belt is one of two tension belts, one of the two tension belts is provided on a side surface of the airbag that corresponds to the center of the passenger compartment, and the other tension belt is provided on a side surface of the airbag that corresponds to a center of the seat.

5. The far-side airbag apparatus according to claim 1, wherein the seam, which divides the first inflation chamber and the second inflation chamber from each other, is a first seam, the tension belt, which is connected to the airbag at the position that corresponds to the first seam, is a first tension belt, the inflation chambers further include a third inflation chamber, the far-side airbag apparatus further comprises a second tension belt having a first end and a second end, the first end of the second tension belt is connected to the airbag at a position that corresponds to a second seam that divides the second inflation chamber and the third inflation chamber from each other, and the second end of the second tension belt is connected to the seat frame.

6. The far-side airbag apparatus according to claim 1, wherein the seat frame has a gutter, the seat frame is embedded in a part of the backrest that corresponds to the center of the passenger compartment such that an inside of the gutter faces a center of the seat, the far-side airbag apparatus is fixed to a side surface of the seat frame that corresponds to the center of the passenger compartment, and the tension belt is wound about a rear end of the seat frame.

7. A far-side airbag apparatus configured to be fixed to a seat frame of a backrest of a vehicle seat, the apparatus comprising:

an airbag;

an inflation fluid generator, which discharges inflation fluid for deploying and inflating the airbag toward a center of a passenger compartment; and first and second tension belts each having a first end and a second end, wherein the airbag is divided into a plurality of inflation chambers, which include a first inflation chamber, a second inflation chamber, and a third inflation chamber, the inflation fluid generator is accommodated in the first inflation chamber, the first end of the first tension belt is connected to a surface of the airbag at a position that corresponds to a first seam that divides the first inflation chamber and the second inflation chamber from each other, the second end of the first tension belt is connected to the seat frame, the first end of the second tension belt is connected to the airbag at a position that corresponds to a second seam that divides the second inflation chamber and the third inflation chamber from each other, and the second end of the second tension belt is connected to the seat frame.

8. A far-side airbag apparatus configured to be fixed to a seat frame of a backrest of a vehicle seat, the apparatus comprising:

an airbag;

an inflation fluid generator, which discharges inflation fluid for deploying and inflating the airbag toward a center of a passenger compartment; and a tension belt having a first end and a second end, wherein the airbag is divided into a plurality of inflation chambers, which include a first inflation chamber and a second inflation chamber, the inflation fluid generator is accommodated in the first inflation chamber, the airbag includes two side surfaces, wherein one of the two side surfaces corresponds to the center of the passenger compartment and the other one of the two side surfaces corresponds to a center of the seat, the first end of the tension belt is connected to the side surface of the airbag which corresponds to the center of the seat, at a position that corresponds to a seam that divides the first inflation chamber and the second inflation chamber from each other, and the second end of the tension belt is connected to the seat frame.

* * * * *